(12) United States Patent
Kamm et al.

(10) Patent No.: US 7,635,315 B2
(45) Date of Patent: Dec. 22, 2009

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZG Friedrichshafen AG, Friedrichshafen (DE)

( * ) Notice: Subject to any disclaimer, the term of this patent is extended or adjusted under 35 U.S.C. 154(b) by 421 days.

(21) Appl. No.: 11/732,256

(22) Filed: Apr. 3, 2007

(65) Prior Publication Data

US 2008/0015080 A1    Jan. 17, 2008

(30) Foreign Application Priority Data

Apr. 6, 2006   (DE) ................ 10 2006 016 189

(51) Int. Cl.
*F16H 3/62* (2006.01)
(52) U.S. Cl. ..................................... 475/278
(58) Field of Classification Search ........................ None
See application file for complete search history.

(56) References Cited

U.S. PATENT DOCUMENTS 6,176,803 B1    1/2001    Meyer et al.

| | | |
|---|---|---|
| 6,634,980 B1 | 10/2003 | Ziemer |
| 6,960,149 B2 | 11/2005 | Ziemer |
| 7,014,589 B2 | 3/2006 | Stevenson |
| 7,018,319 B2 | 3/2006 | Ziemer |

FOREIGN PATENT DOCUMENTS

| | | |
|---|---|---|
| DE | 42 34 572 A1 | 4/1994 |
| DE | 199 49 507 A1 | 4/2001 |
| DE | 100 83 202 T1 | 1/2002 |
| DE | 101 15 983 | 10/2002 |
| DE | 101 15 995 | 10/2002 |
| DE | 10 2004 029 952 A1 | 1/2005 |
| DE | 10 2005 002 337 | 8/2006 |
| DE | 10 2005 032 001 A1 | 2/2007 |

*Primary Examiner*—Dirk Wright
(74) *Attorney, Agent, or Firm*—Davis & Bujold, P.L.L.C.

(57) ABSTRACT

A multi-speed transmission which has shafts, planetary gearsets (RS1, RS2, RS3, RS4) and shifting elements (A, B, C, D, E). Carrier (ST4) of gearset (RS4) and the input shaft couple as shaft (1). Carrier (ST3) of gearset (RS3) and the output shaft couple as shaft (2). Sun gears (SO1, SO4) of gearsets (RS1, RS4) couple as shaft (3). Carrier (ST1) of gearset (RS1) forms shaft (4). Sun gear (SO3) forms shaft (5). Ring gears (HO1, HO3) of gearsets (RS1, RS3) and carrier (ST2) of gearset (RS2) couple as shaft (6). Sun and ring gears (SO2, HO4) respectively of gearsets (RS2, RS4) couple as shaft (7). Ring gear (HO2) is shaft (8). In the flow of power, elements (A, B) are respectively between shafts (3, 4) and a transmission housing; element (C) is between shafts (1, 5); element (D) is between shafts (2, 8); and element (E) is between shafts (5, 7).

33 Claims, 4 Drawing Sheets

| GEAR | ENGAGED SHIFTING ELEMENTS | | | | | RATIO $i$ | STEP $\varphi$ |
|---|---|---|---|---|---|---|---|
| | BRAKE | | CLUTCH | | | | |
| | A | B | C | D | E | | |
| 1 | ● | ● | ● | | | 4.40 | |
| 2 | ● | ● | | | ● | 3.21 | 1.37 |
| 3 | | ● | ● | | ● | 2.23 | 1.44 |
| 4 | | ● | | ● | ● | 1.68 | 1.33 |
| 5 | | ● | ● | ● | | 1.30 | 1.29 |
| 6 | | | ● | ● | ● | 1.00 | 1.30 |
| 7 | ● | | ● | ● | | 0.87 | 1.16 |
| 8 | ● | | | ● | ● | 0.73 | 1.19 |
| R | ● | ● | | ● | | −2.70 | TOTAL 6.03 |

Fig. 2

MULTI-SPEED TRANSMISSION

This application claims priority from German patent application serial no. 10 2006 016 189.0 filed Apr. 6, 2006.

FIELD OF THE INVENTION

The present invention concerns a multi-speed transmission of the planetary type, especially an automatic transmission for a motor vehicle, encompassing one input shaft, one output shaft, four planetary gear sets, at least eight rotatable shafts as well as five shifting elements, the selective engagement of which creates varied rotational speed ratios between the input shaft and the output shaft, to the end that eight forward gears and at least one reverse gear are made available.

BACKGROUND OF THE INVENTION

Automatic transmissions, especially for motor vehicles, include, in accord with the state of the technology of planetary gear sets and which are shifted by friction based shifting elements, such as clutches and brakes, which are customarily connected with a start-up element, which is augmented by a converter lock-up clutch, which may be, for example, a hydrodynamic torque converter or a fluid clutch.

Within the framework of DE 101 15 983 A1 of the applicant, for example, a multi-speed transmission is described, having an input shaft which is bound to an input-side gear set, and possesses an output shaft, which is connected with an output-side gear set, and has a maximum of seven shifting elements, by the selective shifting of which, at least seven forward gears (without range shifting) can be effectively shifted into. The input-side gear set is composed of a shiftable or a non-shiftable planetary gear set or, alternately, be composed of two non-shiftable, mutually coupled planetary gear sets. The output-side gear set is designed as a two carrier, four shaft transmission with two shiftable planetary gear sets and four free shafts. The first free shaft of this two-carrier, four shaft transmission is bound to the first shifting element, the second free shaft is connected to both the second and third shifting elements, the third free shaft engages the fourth and fifth shifting elements and finally, the fourth free shaft is bound to the output shaft. In the case of a multi-speed transmission with a total of six shifting elements, in accord with the invention, it has been proposed that the third free shaft or the first free shaft can be bound additionally with a sixth shifting element. In the case of a multi-speed transmission with a total of seven shifting elements, in accord with the invention, it can be proposed that the third free shaft be bound additionally to a sixth shifting element and the first free shaft be additionally connected to a seventh shifting element.

A plurality of other multi-speed transmissions are, for example, also disclosed by DE 101 15 995 A1 of the applicant, wherein four shiftable, mutually coupled planetary gear sets and six or seven frictional shifting elements are provided, the selective engagements of which, a speed of rotation of the input shaft of the transmission is to be transmitted to an output shaft, so that nine or eleven forward gears and at least one reverse gear stage can be attained. In accord with the accompanying transmission diagram, in each shifting stage two of three shifting elements are engaged, whereupon, a change from one gear to an immediately next higher successive gear, or to an immediately next lower gear, in order to avoid range shifting, respectively only one engaged shifting element need be disengaged and a previously disengaged element can be engaged.

Further in the generic, unpublished patent application DE 10 2005 002 337.1 of the applicant, a multi-speed transmission with one input shaft, one output shaft, four mutually coupled single planetary gear sets and five shifting elements are proposed, whereby eight forward gears can be employed, these being free from range shifting, and shifted into in such a manner, that during one gear change from a forward gear into the next successive higher or lower forward gear, only one of the previously engaged shifting elements need be disengaged and only one of the previously disengaged shifting elements need be engaged. This known multi-speed transmission possesses also a reverse gear. In all forward gears as well as in the reverse gear, three shifting elements are engaged. Relative to the kinematical coupling of the four planetary gear sets among each other as well as to the shafts for input and output, provision has been made to the effect that: a carrier of the fourth planetary gear set is connected to the input shaft to form a first shaft of the transmission, a carrier of the third planetary gear set and the output shaft are bound together to form a second shaft of the transmission, a sun gear of the first planetary gear set and a sun gear of the fourth planetary gear set are connected together to form a third shaft of the transmission, a ring gear of the first planetary gear set forms a fourth shaft of the transmission, a ring gear of the second planetary gear set and a sun gear of the third planetary gear set are bound together to form a fifth shaft of the transmission, a carrier of the first planetary gear set and a ring gear of the third planetary gear set are bound together, to form a sixth shaft of the transmission, a sun gear of the second planetary gear set and a ring gear of the firth planetary gear set are bound together to form a seventh shaft of the transmission and, finally, a carrier of the second planetary gear set forms an eighth shaft of the transmission. Relative to the kinematical coupling of the five shifting elements to the four planetary gear sets and to the input and output shafts, provision has been made to the effect that: the first shifting element can be placed in the power-flow path between the third shaft and the housing of the transmission, the second shifting element can be placed between the fourth shaft and the housing of the transmission, the third shifting element can be placed between the first and the second shafts, the fourth shifting element can be placed either between the eighth and the second shafts, or between the eighth and sixth shafts, and finally the fifth shifting element can be placed either between the seventh and fifth shafts or between the seventh and eighth shafts, or yet between the fifth and eighth shafts.

Automatically shiftable vehicle transmissions, which are based on planetary gear arrangements, are generally of the currently accepted state of the technology, and consequently the subject of frequent descriptions and are continually being developed and improved. Accordingly, these transmissions should possess a sufficient number of forward gears as well as at least one reverse gear. Advantageously, these known transmissions also should have a very satisfactory ratio with a high degree of spread, as well as favorable steps between gears. In addition, these transmission should enable a high startup and acceleration ratio in a forward gear and a have a direct gear for use in both passenger vehicles and trucks. Beyond this, these transmissions should be manufactured with a small cost and little effort and require a minimal number of shifting elements and, where sequential shifting is required, avoid double shifting, so that for shifting in defined gear-ranges respectively, only one shifting element need be changed.

SUMMARY OF THE INVENTION

The present invention has the purpose of proposing a multi-speed transmission of the type mentioned in the introductory passages with at least eight range-shift-free, shiftable forward gears and at least one reverse gear stage, by means of which, under the usage of a total of four planetary gear sets and, the least possible number of shifting elements are required. Additionally, the transmission is to have a large ratio spread with simultaneously a harmonious gear succession and, at least in the main travel gears, a favorable degree of efficiency, and at the same time exhibit a negligible amount of slippage and tooth wear.

The multi-speed transmission, which is based on planetary operation has its background in the transmission diagram of the generic patent application DE 10 2005 002337.1 of the applicant and possesses one input shaft, one output shaft, four planetary gear sets which are coupled together, at least eight rotational shafts as well as five shifting elements (namely two brakes and three clutches), the selective engagement of which activate predetermined speed of rotation ratios between the input shaft and the output shaft, so that eight forward gears and one reverse gear are realized. In each gear, respectively, three of the five shifting elements are engaged, whereby, in case of change from one forward gear into a successively higher or lower forward gear, only one of the previously engaged shifting elements need be disengaged and only one of the previously engaged shifting elements need be engaged.

In accord with the invention, it is proposed, that a carrier of the fourth planetary gear set and the input shaft are continually bound together and form the first shaft of the transmission; a carrier of the third planetary gear set and the output shaft are continually bound together and form the second shaft of the transmission; a sun gear of the first planetary gear set and a sun gear of the fourth planetary gear set are continually bound together and form the third shaft of the transmission; a carrier of the first planetary gear set forms the fourth shaft of the transmission; a sun gear of the third planetary gear set forms the fifth shaft of the transmission; a ring gear of the first planetary gear set and a carrier of the second planetary gear set and a ring gear of the third planetary gear set are continually bound together and form the sixth shaft of the transmission; a sun gear of the second planetary gear set and a ring gear of the fourth planetary gear set are continually bound to each other and form the seventh shaft of the transmission; a ring gear of the second planetary gear set forms the eighth shaft of the transmission; the first shifting element is placed in the power flow between the third shaft and the housing of the transmission; the second shifting element is placed in the power flow between the fourth shaft and the housing of the transmission; the third shifting element is placed in the power flow between the first and the fifth shafts of the transmission; the fourth shifting element is placed in the power flow between the second and the eighth shafts of the transmission, and the fifth shifting element is placed in the power flow between the fifth and the seventh shafts of the transmission.

The multi-speed transmission differs from the generic DE 10 2005 002 337.1 in that the fourth shaft of the transmission is now designed as the carrier of the first planetary gear set, the fifth shaft of the transmission passes through the sun gear of the third planetary gear set, the ring gear of the first planetary gear set and the carrier of the second planetary gear set and the ring gear of the third planetary gear set are bound together as the sixth shaft of the transmission and the ring gear of the second planetary gear set forms the eighth shaft of the transmission.

As in the case of the generic multi-speed transmission in accord with DE 10 2005 002 337.1, it is also true for the multi-speed transmission, that the desired gears are obtained for the first forward gear by engaging the first, second, and third shifting elements; the second forward gear is achieved by engaging the first, second and fifth shifting elements; the third forward gear is achieved by engaging the second, third and fifth shifting elements; the fourth forward gear is achieved by engaging the second, fourth and fifth shifting elements; the fifth forward gear is achieved by engaging the second, third and fourth shifting elements; the sixth forward gear is achieved by engaging the third, fourth and fifth shifting elements; the seventh forward gear is achieved by engaging the first, third, and fourth shifting elements; the eighth forward gear is achieved by engaging the first, fourth and fifth shifting element and the reverse gear is achieved by engaging the first, second and fourth shifting elements.

Three of the four planetary gear sets are designed as the so-called negative planetary gear sets, the respective planet gears of which mesh with the corresponding sun and ring gears. One of the four planetary gear sets, that is to say, the first planetary gear set, is designed as a so-called positive planetary gear set, wherein the inner planet gears of the same mesh with the sun gear of this positive planetary gear set, and whereby the outer planet gears thereof also mesh with the ring gear of the same. Giving consideration to the spatial arrangement of the four planetary gear sets within the housing of the transmission, the proposal, for an advantageous assembly is, to place the four planetary gear sets coaxially aligned with one another in a sequential order of, "first, fourth, second, third planetary gear set".

The space occupying arrangement of the shifting elements of the multi-speed transmission within the transmission housing is, principally, limited by the dimensions and the outer shape of the housing. A multitude of arrangements regarding the spatial positioning and constructive design of the shifting elements are, for example, disclosed by the generic patent application DE 10 2005 002 337.1.

Thus, it becomes possible to provide, where the shifting element arrangement is concerned, favorable variants for a standard input drive, in that the first and the second shifting elements, are spatially placed, at least partially, in an area radially located above the first or fourth planetary gear sets, the third and fifth shifting elements, again giving consideration to space requirements, are placed in an area between the fourth and the second planetary gear sets, the fourth shifting element is placed, at least partially, in an area located axially between the second and third planetary gear sets. As a preferred design arrangement, it is possible that a common disk carrier can be provided for the third and fifth shifting elements. Limited by installation space requirements, the third and the fifth shifting elements can, at least partially, be placed axially beside one another or be located at least partially radially above one another. Again, with respect given to spatial conditions, it is possible that the first and the second shifting elements can, at least partially, be axially located next to one another or at least partially radially above one another.

By means of the design of the multi-speed transmission, inherent gear ratios become available, especially for personal motor vehicles, which have a large total ratio spread in a harmonic gear succession. Moreover, with the multi-speed transmission, it is possible that with advantageously few shifting elements, namely two brakes and three clutches, time and expense for assembly thereof is relatively small. Additionally, there is made available by the invented multi-speed transmission, a degree of efficiency in all gears, first, due to reduced slip losses, since in each gear, respectively, only two shifting elements are disengaged, and second, because of a much reduced loss of tooth wear in the economically constructed individual planetary gear sets.

Further, in a favorable direction, it is advantageously possible, with the multi-speed transmission to initiate drive with a hydrodynamic converter, an external startup clutch or even with other thereto adapted external startup elements. Consideration can also be given to the fact that the startup procedure can be advantageously enabled by means of a startup element integrated within the transmission. Advantageously, one of the given two brakes can be adapted to this latter startup means, since the brake is engaged both the first and second forward gear as well as in the reverse gear.

Beyond this, the multi-speed transmission is so conceived, that it is adaptable to meet different drive train arrangements both in the power flow direction as well as in spatial installation conditions. Thus, without special design measures, it is possible to arrange the input and output shafts to be optionally either coaxial to one another or aligned in an axis-parallel mode.

To design of an arrangement wherein input and output shafts run coaxially to one another, it is of value, if the first planetary gear set be the planetary gear set of the planetary gear set range, which is proximal to the transmission input drive. In accord with the spatial arrangement of the five shifting elements within the transmission housing, provision can be made, that all four planetary gear sets can be centrally and axially passed through by one shaft of the transmission. Thus, in connection with a shifting element arrangement, wherein the four planetary gear sets are coaxially arranged and placed in a "first, fourth, second, third" sequential order, the first and second shifting elements being placed proximal to the input side in an area radially above the first or fourth planetary gear set, the third and fifth shifting elements, at least partially, are placed in an area axially located between the fourth and second planetary gear sets, and the fourth shifting element is axially placed at least partially in an area between the second and the third planetary gear sets, the first and fourth planetary gear sets are passed through, axially and centrally, only by the first shaft of the transmission, while the second planetary gear set is centrally passed through only by the fifth shaft of the transmission in the axial direction, and the third planetary gear set must not be passed through by any shaft. The means for supplying pressure and lubrication to the servo-apparatuses of the individual shifting elements is of a correspondingly simple design.

For an arrangement wherein the input and output shafts are axis-parallel or at an angle to one another, it is possible that the first or the third planetary gear set can be placed on that side of the transmission housing, which is proximal to the drive motor of the transmission, which is operationally connected to the input shaft. If the first planetary gear set is proximal to the input drive of the transmission, then, the possibility arises—as in the above coaxial arrangement of the input and output shafts—in accord with the spatial limitations of the arrangement of the five shifting elements within the transmission housing—that provision can be made to the effect that all four planetary gear sets, respectively will be axially and centrally passed through by one shaft of the transmission. Further, the first and the fourth planetary gear sets are passed through by only the first shaft of the transmission and the second planetary gear set is passed through by only the fifth shaft of the transmission.

If, in connection with the arrangement of the input and output shafts not being coaxial, on the other hand, the third planetary gear set is proximal to the input drive of the transmission, then the requirement is, that the first and the fourth planetary gear set must not be passed through by a shaft of the transmission. Relative to the above mentioned arrangement of the third and fifth shifting element, being axially placed between the second and fourth planetary gear sets and of the fourth shifting element being axially between the second and the third planetary gear sets for example, the second planetary gear set is centrally passed through by both the fifth shaft of the transmission as well as by the first shaft of the transmission, which latter runs sectionally and centrally within this fifth shaft, while the third planetary gear set is centrally penetrated in the axial direction only by the first shaft.

In all cases, it is possible that the third shaft of the transmission, which is formed by the sun gears of the first and fourth planetary gear sets, can be rotationally affixed on a hub, which hub, in turn, is affixed to the transmission housing. If the first planetary gear set is proximal to the input drive of the transmission, then this housing-affixed hub is a component of the input drive side of the transmission housing wall, otherwise, it is a component of the transmission housing wall which lies opposite to the drive motor of the transmission.

BRIEF DESCRIPTION OF THE DRAWINGS

In the following, the invention is described and explained in greater detail with the aid of the drawings. The same components, or components comparative thereto are, in the drawings, designated by the same reference numbers. There is shown in.

DETAILED DESCRIPTION OF THE PREFERRED EMBODIMENTS

Figure 1:
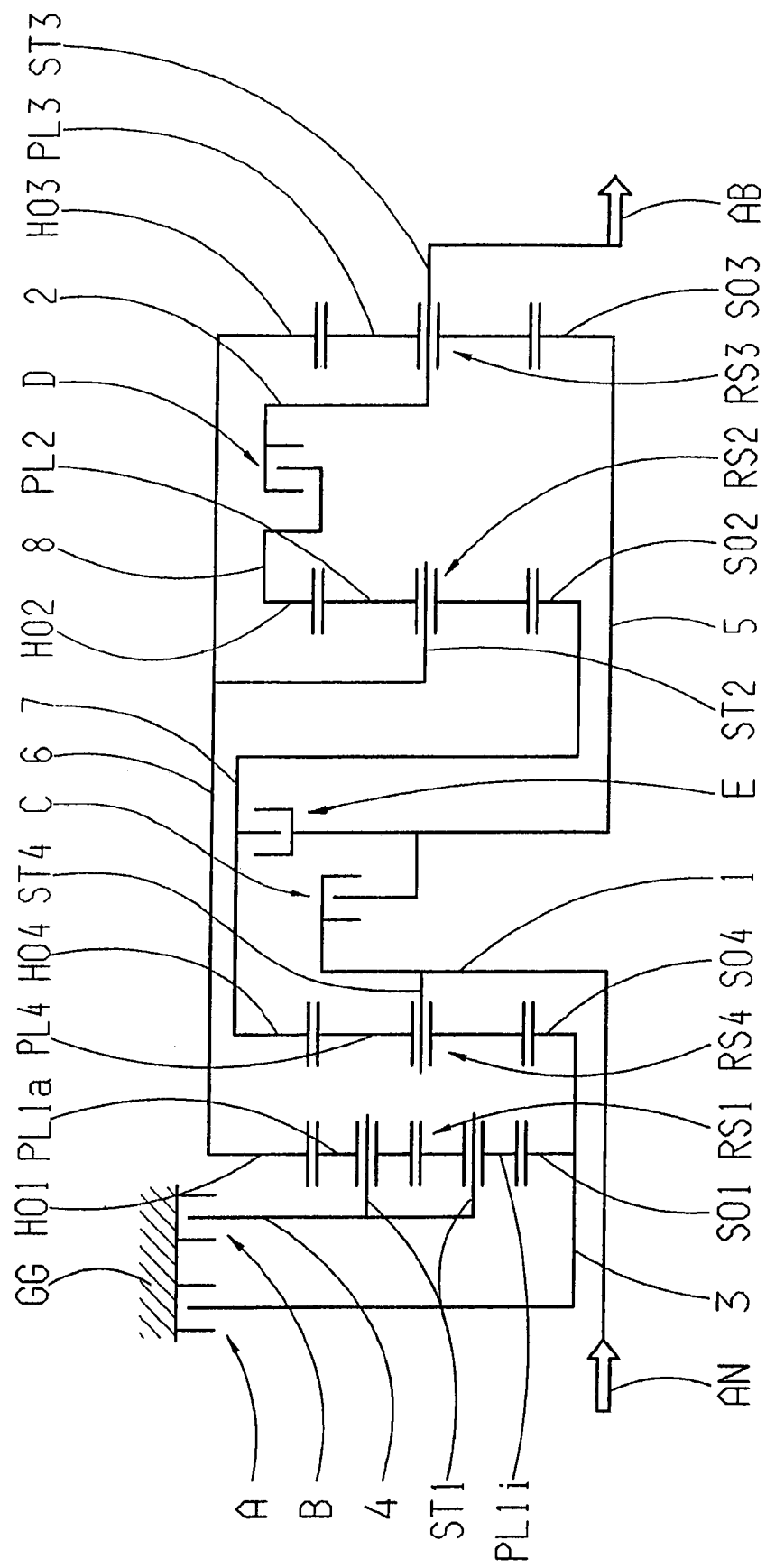
FIG. 1 which is a schematic illustration of an embodiment of a multi-speed transmission in accord with the invention, and in FIG. 2 which is an exemplary shifting diagram for the multi-speed transmission which is shown in FIG. 1.

FIG. 1 shows an embodiment of a multi-speed transmission in a schematic presentation. The transmission encompasses an input shaft AN and an output shaft AB, as well as four planetary gear sets RS1, RS2, RS3, RS4 and five shifting elements A, B, C, D, E, which are all enclosed within one housing GG of the transmission. The four planetary gear sets RS1, RS2, RS3, RS4, in this embodiment example, are arranged, coaxially, one after the other in the sequential order "RS1, RS4, RS2, RS3". The planetary gear sets RS2, RS3 and RS4 are designed as single negative planetary gear sets. A negative planetary gear set possesses, as is known, planet gears which mesh with the integral sun gear and ring gear of the respective planetary gear set. The ring gears of the planetary gear sets RS2, RS3, RS4 are designated with the reference numbers HO2, HO3 and HO4, the sun gears thereof with SO2, SO3 and SO4, the planet gears are shown as PL2, PL3 and PL4, and the carriers, on which the planetary gears are rotatably mounted, are designated respectively, ST2, ST3 and ST4. The planetary gear set RS1 is constructed as a single positive planetary gear set in a double-planetary assembly method. A positive planetary gear set possesses as is known, intermeshing inner and outer planet gears, whereby these inner planet gears also mesh with the sun gear of this planetary gear set, and whereby these outer planet gears also mesh with the ring gear of this planetary gear set. The ring gear of the planetary gear set RS1 is designated as HO1, the sun gear as SO1, the inner planet gears as PL1$i$, the outer planet gears as PL1$a$, the carrier, on which the inner and outer planet gears PL1$i$, PL1$a$ are rotatably affixed, is designated as ST1. The shifting elements A and B are designed as brakes, which, in the here presented embodiment are constructed as frictional, shiftable, disk brakes. Obviously, in another embodiment example, the described frictional, shiftable brakes can as well be installed as claw or wedge brakes. The shifting elements C, D and E are designed as clutches, which, in the presented example, are all built as frictional, shiftable disk clutches. Again, obviously, in another arrangement, these could be shape-fixed, shiftable dog or cone clutches. With these five shifting elements A to E, a selective shifting of eight forward gears and at least one reverse gear can be realized. The multi-speed transmission possesses, a total of at least eight rotationally capable shafts, which are individually designated by the reference numbers 1 through 8.

In regard to the kinematic coupling of the individual elements of the four planetary gear sets RS1, RS2, RS3, RS4 among themselves and to the input and output shafts AN, AB, the following is provided: The carrier ST4 of the fourth planetary gear set RS4 and the input shaft AN are continually connected together and form the shaft 1. The carrier ST3 of the third planetary gear set RS3 and the output shaft AB are continually connected together and form the shaft 2. The sun gears SO1, SO4 of the first and the fourth planetary gear sets RS1, RS4 are continually connected together and form the shaft 3. The coupled carrier ST1 of the first planetary gear set RS1 forms the shaft 4. The sun gear SO3 of the third planetary gear set RS3 forms the shaft 5. The ring gear HO1 of the first planetary gear set RS1, the carrier ST2 of the second planetary gear set RS2 and the ring gear HO3 of the third planetary gear set RS3 are continually bound together and form the shaft 6. The ring gear HO4 of the fourth planetary gear set RS4 and the sun gear of the second planetary gear set RS2 are continually connected together and form the shaft 7. The ring gear HO2 of the second planetary gear set RS2 forms the shaft 8.

Considering now the kinematic coupling of the five shifting elements A to E to the so described shafts 1 to 8 of the transmission, the following is provided in the case of the multi-speed transmission in accord with FIG. 1:

The brake A, serving as a first shifting element is placed in the power flow between the shaft 3 and the housing GG of the transmission. The brake B, serving as a second shifting element is placed in the path of the power flow between the shaft 4 and the housing GG of the transmission. The clutch C, which is the third shifting element is placed in the path of the power flow between the shaft 1 and the shaft 5. The clutch D, being the fourth shifting element is placed in the path of the power flow between the shaft 2 and the shaft 8. The clutch E, serving as fifth shifting element is placed in the path of the power flow between the shaft 5 and the shaft 7.

In the embodiment shown in FIG. 1, the first planetary gear set RS1 is the gearset proximal to the input-side and the third planetary gear set RS3 of the gearset proximal to the output-side of the transmission, whereby input shaft AN and output shaft AB, for example, are arranged to be coaxial to one another. It will be immediately evident to the expert, that this transmission, without special effort can be so modified, such that the input and output shafts are no longer coaxial to one another, but for example, can now be axis parallel or angularly disposed in relation to one another. In the case of an arrangement of this type, the expert, upon need, would place the input drive of the transmission near the third planetary gear set RS3, that is to say, on that side of the third planetary gear set RS3, which is remote from the first planetary gear set RS1.

Principally, it is possible that the spatial arrangement of the shifting elements of the embodiment shown in FIG. 1 of the inventive multi-speed transmission can be optionally within the transmission, and would only be limited by the overall dimensions and the outside shape of the transmission housing GG.

In the embodiment presented in FIG. 1, the two brakes, A and B, when seen in relation to their occupying space, have been placed in the area of the first planetary gear set RS1, which is proximal to the input drive. When this is done, the brakes are axially aligned beside one another whereby the kinematic connection of the brakes A and B is related to the first planetary gear set RS1 in that the brake B is nearer to the fourth planetary gear set RS4, which in turn is adjacent the first planetary gear set RS1, than the brake A, in other words, the brake A is placed nearer the input drive of the transmission than the brake B. Spatially observed, the brake B is placed partially in an area radially located above the first planetary gear set RS1 and the brake A is correspondingly on that side of the first planetary gear set RS1, which is remote from the fourth planetary gear set RS4 (that is to say, near to the input drive). An inner disk carrier of the brake A forms a section of the shaft 3 of the transmission and is rotationally affixed to the sun gear SO1 of the first planetary gear set RS1, on that side thereof, which is remote from the fourth planetary gear set RS4. In a sectional way, the shaft 3 is designed as a type of sun shaft, which binds together the sun gears SO1, SO4 of the planetary gear sets RS1, RS4. In this way, it is possible that the shaft 3 can be rotationally affixed on both the input shaft AN as well as on a (not shown in greater detail in FIG. 1) a housing fastened hub. An inner disk carrier of the brake B forms a section of the shaft 4 of the transmission and is rotationally affixed to the coupled carrier ST1 of the first planetary gear set RS1. The servo-apparatuses which are necessary for the activation of the frictional elements of the two brakes A and B are not shown in greater detail in FIG. 1 and can, for example, be slidably mounted in the transmission housing GG or integrated in a transmission housing affixed cover, that is to say, be placed in a slidable manner.

Upon need, the expert could modify this exemplary spatial arrangement of the two brakes A and B without any special inventive effort. In this way, it is possible that the brake A, for example, could be placed at least partially radially above the first planetary gear set RS1 and the brake B be located partially and radially above the fourth planetary gear set RS4. In still another arrangement, it is possible that the two brakes A and B could also be located radially above one another, thus axially bordering the first planetary gear set RS1 on that side thereof which is remote from the fourth planetary gear set RS4. In such a case, the brake B is then, for example, located at a greater diameter than the brake A.

As may further be inferred from FIG. 1, the disk sets of the clutches C and E, spatially considered, are to be found in an area axially located between the fourth and second planetary gear sets RS4 and RS2, while at least the disk set of the clutch D, again considered as to space occupied, would accordingly be placed in an area between the second and the third planetary gear sets RS2 and RS3. The servo-apparatuses necessary for the activation of the disk set of the three clutches C, D and E, for the sake of clarity, are not described in greater detail in FIG. 1.

Directly and axially, the clutch C borders the fourth planetary gear set RS4. In this arrangement, an outer disk carrier of the clutch C, is rotationally affixed to the carrier ST4 of the fourth planetary gear set RS4 and to the input shaft AN on that side of the disk set of the clutch C, which is proximal to the fourth planetary gear set RS4. On this account, the outer disk carrier of the clutch C can be regarded as a section of the shaft 1 of the transmission. An inner disk carrier of the clutch C is rotationally affixed to the sun gear SO3 of the third planetary gear set RS3 and therefore can also be regarded as a section of the shaft 5 of the transmission. The servo-apparatus necessary for the activation of the disk set of the clutch C can, for example, be placed within that cylindrical space, which is created by the outer disk carrier of the clutch C. This servo-apparatus, can additionally, be axially and slidably mounted on the outer disk carrier of the clutch C, whereby it would rotate thereafter continually at the same speed of rotation as the shaft 1, that is to say, the input shaft. For compensation of the centrifugal pressure of the rotating pressure chamber of this servo-apparatus, it is possible that the clutch C, in a known manner, could possess a dynamic pressure compensation means.

As is further to be seen in FIG. 1, the disk set of the clutch E, with consideration given to spatial conditions, borders the second planetary gear set RS2 and on this account, for example, is placed in an area axially located between the disk set of the clutch C and the second planetary gear set RS2. Obviously, it is also possible that the disk set of the clutch E, spatially considered, be placed radially above the disk set of the clutch C. An inner disk carrier of the clutch E is—as is also the case for the inner disk carrier of the clutch C—rotationally affixed with the sun gear SO3 of the third planetary gear set RS3, and on this account, can also be regarded as a section of the shaft 5 of the transmission. In this way, it is possible, that in the production of the clutches C and E, advantageously a common disk carrier is provided. An outer disk carrier of the clutch E is rotationally affixed with the ring gear HO4 of the fourth planetary gear set RS4 and to the sun gear SO2 of the second planetary gear set RS2, whereby it forms a section of the shaft 7 of the transmission. The servo-apparatus necessary for the activation of the disk set of the clutch E can be axially and slidably mounted on the inner disk carrier of the clutch E, whereby it would rotate continually at the speed of rotation of the shaft 5. Alternately, however, the servo-apparatus can be axially and slidably mounted on the outer disk carrier of the clutch E, whereby it would rotate continually at the speed of rotation of the shaft 7. Obviously, it is possible that the servo-apparatus of the clutch E could have a dynamic pressure compensation means.

Deviating from the present embodiment of in FIG. 1, it is possible that in another arrangement of the transmission, provision can be made, that the two clutches, namely C and E form a factory-side, preassembled component, which encompasses disk sets, which are radially stacked, one over the other, for the clutches C and E, as well as including a common disk carrier. Also provided therein are servo-apparatuses for the activation of the respective disk sets of the clutches C and E, whereby the disk packet of the clutch C is placed radially beneath the disk set of the clutch E, and the common disk carrier, for the (radially inner) clutch C, is designed as an outer disk carrier and, for the (radial outer) clutch E, is designed as an inner disk carrier and further is continually bound to the sun gear SO3 of the third planetary gear set RS3 and serves as a section of the shaft 5 of the transmission, and whereby both servo-apparatuses are axially and slidably mounted on the common disk carrier.

As may be further seen in FIG. 1, the clutch D borders axially and directly on the second planetary gear set RS2. In this arrangement, an inner disk carrier of the clutch D is rotationally affixed to the ring gear HO2 of the second planetary gear set RS2, thus forming a section of the shaft 8 of the transmission. An outer disk carrier of the clutch D is rotationally affixed to the carrier ST3 of the third planetary gearset RS3 and also with the output shaft AB and thus forms a section of the shaft 2 of the transmission. The servo-apparatus necessary for activation of the disk set of clutch D, can, for example, be placed within the cylindrical space formed by the outer disk carrier of the clutch D and be slidably and axially mounted on the outer disk carrier of the clutch D and thus continually rotate at the speed of the shaft 2. Provision can be made, however, that the servo-apparatus of the clutch D be axially and slidably mounted on the inner disk carrier of the clutch D and then continually rotate at the speed of the shaft 8. For compensation of the rotational pressure of the rotating pressure chamber of this servo-apparatus, it is possible that the clutch D, in a known manner, have a dynamic compensation means.

Corresponding to the gear set diagram, and corresponding to the sequential order "RS1, RS4, RS2, RS3" of the four planetary gear sets, respectively, RS1, RS2, RS2 and RS4 and corresponding to arrangement of the three clutches C, D and E in an area located axially between the fourth and the third planetary gear sets RS4 and RS3, the shaft 6 of the transmission in its axial run, completely over laps the fourth planetary gear set RS4, the two clutches C and E, the second planetary gear set RS2 as well as the clutch D.

It is to be emphatically noted, that the above described arrangement of the three clutches C, D and E is to be regarded only as an example. Upon specific need, the expert can also modify this exemplary spatial arrangement of the three clutches C, D and E. A multitude of arrangements to this end can be inferred from the patent application DE 102005002337.1. Thus it is possible, again as an example—without essentially changing the construction shown in FIG. 1 of the therein presented transmission—that provision can be made, in that the disk set of the clutch E, with spatial considerations, can be, at least partially, placed radially above the disk set of the clutch C, and that also the clutch E, again with spatial considerations, can be placed at least partially radially above the clutch C.

In FIG. 2 is shown a shifting diagram of the inventive multi-speed transmission similar to FIG. 1. In each gear, three shifting elements are engaged, and two shifting elements are disengaged. Beside the shifting logic, it is possible to gain exemplary values for the specific ratios "i" of the individual gears and the inter-stage steps φ. The given ratios i are taken from the (typical) stationary transmission ratios of the four planetary gear seats, namely RS1, RS2, RS3, RS4, these being +3.50, −3.70, −3.40 and −2.70. Further, it is possible to infer from the shifting diagram that during sequential shifting methods the following procedures are avoided, namely, double shifting, or range shifting. This is due to the fact that in the shifting logic, neighboring gears employ two shifting elements in common. The sixth gear stage is designed as a direct gear stage.

The first forward gear is achieved by engaging of the brakes A and B and the clutch C, the second forward gear by engaging the brakes A and B and the clutch E, the third forward gear by engaging the brake B and the clutches C and E, the fourth forward gear by engaging the brake B and the clutches D and E, the fifth forward gear by engaging the brake B and the clutches C and D, the sixth forward gear by engaging the clutches C, D and E, the seventh forward gear by engaging the brake A and the clutches C and D, and finally the eighth forward gear by engaging the brake A and the clutches D and E. As may be further gained from the shifting diagram, the reverse gear is obtained by engaging the brakes A and B and the clutch D.

In accord with the invention, initiating drive of a motor vehicle is possible with a shifting element integrated in the transmission. In such a case, a shifting element is particularly acceptable, if it is a necessary element in both forward travel as well as reverse travel, these characteristics are present in the brake A or in the brake B. Advantageously, these two brakes A, B are also required in the second forward gear stage. If the brake B is used as a startup element in the transmission, accordingly startup in the first five forward gears and in the reverse gear stage becomes possible. As may be seen in the shifting diagram it is possible to employ both the clutch C for forward travel and the clutch D for reverse travel, these clutches being used as internal transmission startup elements.

For the previously presented and described embodiment of the multi-speed transmission the following is of continuing value:

In accord with the invention, it is possible, even with the same shifting diagram, in accord with the stationary transmission ratios of the individual planetary gear sets, to have varying gear-to-gear steps so that an application-specific, i.e., a vehicle-specific variation, would be available.

Figure 8:
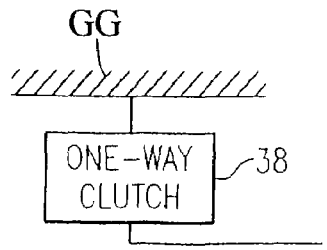
FIG. 8, a diagrammatic view of an embodiment of the inventive multi-speed transmission having a one-way clutch.

It is additionally possible, as is shown in FIG. 8, to provide at every characteristic position of a multi-speed transmission one-way clutches 38, for example between a shaft and the housing or in order to connect two shafts.

Figure 3:
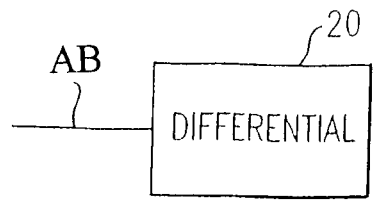
FIG. 3, a diagrammatic view of an embodiment of the inventive multi-speed transmission having a differential.

On the input drive side or on the output drive side, an axle-differential 20 or a transfer-differential can be installed as shown in FIG. 3.

Figure 4:
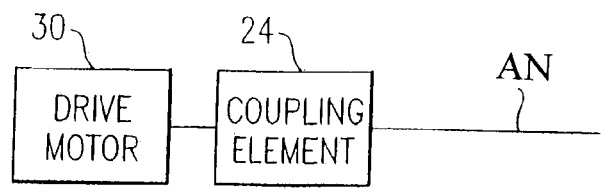
FIG. 4, a diagrammatic view of an embodiment of the inventive multi-speed transmission with a coupling element and a drive motor.
Figure 5:
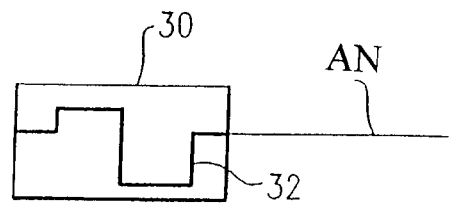
FIG. 5, a diagrammatic view of an embodiment of the inventive multi-speed transmission with a crankshaft of the drive motor fixed to an input shaft of the multi-speed transmission.
Figure 12:
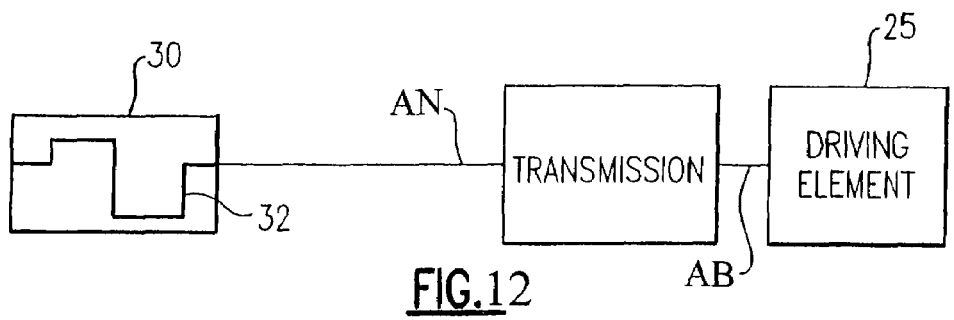
FIG. 12, a diagrammatic view of another embodiment of the inventive multi-speed transmission with the crankshaft of the drive motor fixed to the input shaft of the multi-speed transmission and the coupling element located behind the multi-speed transmission.

Within an advantageous development, as shown in FIG. 4, it is possible that the input shaft AN can be separated by a coupling element 24 from a startup motor under needful conditions, whereby, as such a coupling element a hydrodynamic converter, a hydraulic clutch, a dry startup clutch, a wet startup clutch, a magnetic-powder clutch or a centrifugal clutch can be applied. It is also possible, as shown in FIG. 12, to place such a driving element 25 in the power flow behind the transmission, whereby, in such a case, the input shaft AN is continually bound to the crankshaft 32 of the drive motor 30 as shown in FIG. 5.

Figure 6:
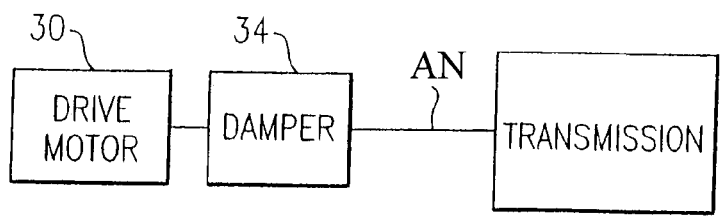
FIG. 6, a diagrammatic view of an embodiment of the inventive multi-speed transmission having the drive motor communicating with a damper.

The multi-speed transmission also enables, as shown in FIG. 6, the placement of a torque-vibration damper 34 between the drive motor 30 and the transmission.

Figure 7:
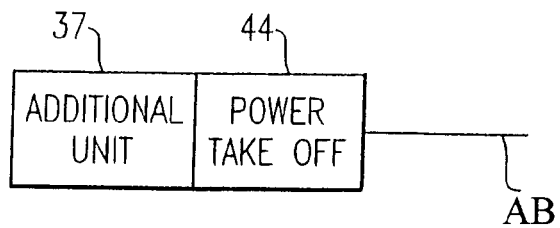
FIG. 7, a diagrammatic view of an embodiment of the inventive multi-speed transmission with a power take-off for driving an additional unit.
Figure 10:
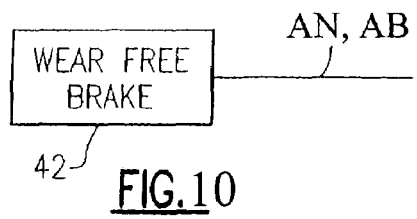
FIG. 10, a diagrammatic view of a preferred design of the inventive multi-speed transmission having a wear free brake.
Figure 11:
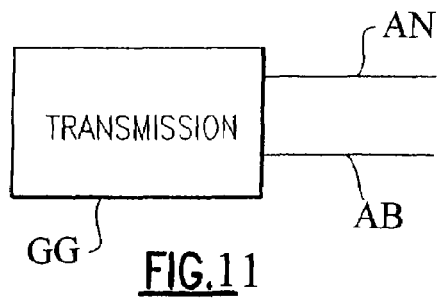
FIG. 11, a diagrammatic view of a further embodiment of the invention with the input and the output being provided on the same side of the multi-speed transmission housing.

Within the limits of yet another development of the invention, as shown in FIG. 10, it is possible that on any shaft, preferably on the input shaft AN or on the output shaft AB to place a wear-free brake 42, such as, for example, a hydraulic or electric retarder or the like, which, especially for installation in commercial vehicles, can be of considerable importance. In addition, as shown in FIG. 7, it is possible that for the powering of additional units 37 on each shaft, preferably on the input shaft AN or on the output shaft AB a duplicate power take-off 44 could be provided. Additionally, as shown in FIG. 11, the input and the output are provided on the same side of the housing GG.

The applied shifting elements can be designed as power shifting clutches or power-shift brakes. Especially, friction locking clutches or friction locking brakes, such as, for instance, multi-disk clutches, band brakes and/or cone clutches, could be used. In addition it is possible that to serve as shifting elements, form fit brakes and/or form fit clutches, such as, for example, synchronization devices or claw clutches could be employed.

Figure 9:
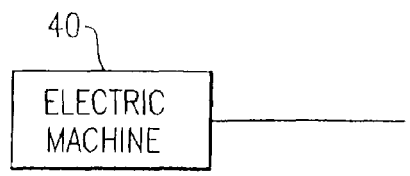
FIG. 9, a diagrammatic view of an embodiment of the inventive multi-speed transmission with an electric machine.

An additional advantage of the presented multi-speed transmission is shown in FIG. 9, that on each shaft, an electrical machine 40 can be installed as an augmenting generator and/or as an additional drive unit.

Obviously, every improvement of design, for instance a spatial arrangement of the planetary sets and/or shifting elements, for themselves alone, or in combination therebetween, falls under the protective breadth of the present claims, as such protections are stated in the claims, without the influence of the function of a transmission, this being true even if the explanation thereof, or the depictions in the figures are not explicitly stated in the description.

REFERENCE NUMBERS AND
CORRESPONDING COMPONENTS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gear set
HO1 ring gear of first planetary gear set
SO1 sun gear of first planetary gear set
ST1 carrier of first planetary gear set
PL1a outer planet gears of the first planetary gear set
PL1i inner planet gears of the first planetary gear set
RS2 second planetary gear set
HO2 ring gear of the second planetary gear set
SO2 sun gear of the second planetary gear set
ST2 carrier of the second planetary gear set
PL2 planet gears of the second planetary gear set
RS3 third planetary gear set HO3 ring gear of the third planetary gear set
SO3 sun gear of the third planetary gear set
ST3 carrier of the third planetary gear set
PL3 planet gears of the third planetary gear set
RS4 fourth planetary gear set
HO4 ring gear of the fourth planetary gear set
SO4 sun gear of the fourth planetary gear set
ST4 carrier of the fourth planetary gear set
PL4 planet gears of the fourth planetary gear set
i gear ratio
φ spring, between gear steps

The invention claimed is:

1. A multi-speed automatic transmission for a motor vehicle of a planetary design, the transmission comprising:
   an input shaft (AN);
   an output shaft (AB);
   first, second, third and fourth planetary gearsets (RS1, RS2, RS3, RS4), and each of the first, the second, the third and the fourth planetary gearsets (RS1, RS2, RS3, RS4) comprising a sun gear, a carrier and a ring gear;
   at least first, second, third, fourth, fifth, sixth, seventh and eighth rotatable shafts (1, 2, 3, 4, 5, 6, 7, 8) and first, second, third, fourth and fifth shifting elements (A, B, C, D, E) whose selective engagement creates different gear ratios, between the input shaft (AN) and the output shaft (AB), so that eight forward gears and at least one reverse gear can be implemented;
   wherein the carrier (ST4) of the fourth planetary gearset (RS4) and the input drive shaft (AN) are permanently connected and form the first shaft (1);
   the carrier (ST3) of the third planetary gearset (RS3) and the output drive shaft (AB) are permanently connected and form the second shaft (2);
   the sun gear (SO1) of the first planetary gearset (RS1) and the sun gear (SO4) of the fourth planetary gearset (RS4) are permanently connected and form the third shaft (3);
   the carrier (ST1) of the first planetary gearset (RS1) forms the fourth shaft (4);
   the sun gear (SO3) of the third planetary gearset (RS3) forms the fifth shaft (5);
   the ring gear (HO1) of the first planetary gearset (RS1), the carrier (ST2) of the second planetary gear set (RS2) and the ring gear (HO3) of the third planetary gear (RS3) are permanently connected and form the sixth shaft (6);
   the sun gear (SO2) of the second planetary gearset (RS2) and the ring gear (HO4) of the fourth planetary gearset (RS4) are permanently connected and form the seventh shaft (7);
   the ring gear (HO2) of the second planetary gearset (RS2) forms the eighth shaft (8);
   the first shifting element (A) is arranged between the third shaft (3) and a transmission housing (GG) of the transmission;
   the second shifting element (B) is arranged between the fourth shaft (4) and the transmission housing (GG) of the transmission;
   the third shifting element (C) is arranged, in a direction of power flow, between the first shaft (1) and the fifth shaft (5);
   the fourth shifting element (D) is arranged, in the direction of power flow, between the second shaft (2) and the eighth shaft (8); and
   the fifth shifting element (E) is arranged, in the direction of power flow, between the fifth shaft (5) and the seventh shaft (7).

2. The multi-speed transmission according to claim 1, wherein:
   a first forward gear is achieved by engagement of the first shifting element (A), the second shifting element (B) and the third shifting element (C);
   a second forward gear is achieved by engagement of the first shifting element (A), the second shifting element (B), and the fifth shifting element (E);
   the third forward gear is achieved by engagement of the second shifting element (B), the third shifting element (C) and the fifth shifting element (E);
   a fourth forward gear is achieved by engagement of the second shifting element (B), the fourth shifting element (D) and the fifth shifting element (E);
   a fifth forward gear is achieved by engagement of the second shifting element (B), the third shifting element (C) and the fourth shifting element (D);
   a sixth forward gear is achieved by engagement of the third shifting element (C) the fourth shifting element (D) and the fifth shifting element (E);
   a seventh forward gear is achieved by engagement of the first shifting element (A), the third shifting element (C) and the fourth shifting element (D);
   a eighth forward gear is achieved by engagement of the first shifting element (A), the fourth shifting element (D) and the fifth shifting element (E); and
   a reverse gear is achieved by engagement of the first shifting element (A), the second shifting element (B) and the fourth shifting element (D).

3. The multi-speed transmission according to claim 1, wherein the second planetary gearset (RS2), the third planetary gearset (RS3) and the fourth planetary gearset (RS4) are all negative planetary gearsets, and the first planetary gearset (RS1) is a positive planetary gearset.

4. The multi-speed transmission according to claim 1, wherein the first planetary gearset (RS1), the second planetary gearset (RS2), the third planetary gearset (RS3) and the fourth planetary gearset (RS4) are co-axial and arranged, in an axial direction, in a sequential order of:
   the first planetary gearset (RS 1), the fourth planetary gearset (RS4), the second planetary gearset (RS2), and the third planetary gearset (RS3).

5. The multi-speed transmission according to claim 1, wherein the input shaft (AN) is one of axially parallel and at an angle to the output shaft (AB), and one of the first planetary gearset (RS1) and the third planetary gearset (RS3) is located on a side of the transmission housing (GG) closest to a drive motor which is connected to the input shaft (AN) of the transmission.

6. The multi-speed transmission according to claim 1, wherein the input shaft (AN) is co-axial with the output shaft (AB), and the first planetary gearset (RS1) is located on a side of the transmission housing (GG) closest a drive motor which is connected to the input shaft (AN).

7. The multi-speed transmission according to claim 1, wherein each of the first planetary gearset (RS1), the second planetary gearset (RS2), the third planetary gearset (RS3) and the fourth planetary gearset (RS4) are respectively radially centrally passed through, in an axial direction, by only one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8).

8. The multi-speed transmission according to claim 1, wherein the first planetary gearset (RS1) and the fourth planetary gearset (RS4) are centrally passed through, in an axial direction, by only the first shaft (1) and the second planetary gearset (RS2) is centrally passed through, in the axial direction, by only the fifth shaft (5).

9. The multi-speed transmission according to claim 1, wherein neither the first planetary gearset (RS1) nor the fourth planetary gearset (RS4) is centrally passed through by any of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8), and the second planetary gearset (RS2) is axially, centrally passed through by both the fifth shaft (5) and the first shaft (1), and the third planetary gearset (RS3) is axially, centrally passed through by only the first shaft (1).

10. The multi-speed transmission according to claim 1, wherein the third shaft (3) is rotatably connected to a hub which is connectable to the transmission housing (GG).

11. The multi-speed transmission according to claim 1, wherein at least one of the first shifting element (A) and the second shifting element (B) is radially located at least partially above one of the first planetary gearset (RS1) and the fourth planetary gearset (RS4).

12. The multi-speed transmission according to claim 1, wherein the first shifting element (A) is adjacent the second shifting element (B) and at least one friction element of the second shifting element (B) is located closer to the fourth planetary gearset (RS4) than a friction element of the first shifting element (A).

13. The multi-speed transmission according to claim 1, wherein one of the first shifting element (A) is radially located above the second shifting element (B) and the second shifting element (B) is radially located above the first shifting element (A).

14. The multi-speed transmission according to claim 1, wherein the third shifting element (C) is axially located at least partially between the fourth planetary gearset (RS4) and the second planetary gearset (RS2).

15. The multi-speed transmission according to claim 1, wherein the third shifting element (C) is directly axially adjacent the fourth planetary gearset (RS4).

16. The multi-speed transmission according to claim 1, wherein the fifth shifting element (E) is axially located at least partially between the fourth planetary gearset (RS4) and the second planetary gearset (RS2).

17. The multi-speed transmission according to claim 1, wherein the fifth shifting element (E) is axially adjacent the second planetary gearset (RS2).

18. The multi-speed transmission according to claim 1, wherein the third shifting element (C) is adjacent the fifth shifting element (E), and a disk set of the third shifting element (C) is located closer to the fourth planetary gearset (RS4) than a disk set of the fifth shifting element (E).

19. The multi-speed transmission according to claim 1, wherein the third shifting element (C) and the fifth shifting element (E) are located at least partially one above another, and a disk set of the fifth shifting element (E) is radially located at least partially above a disk set of the third shifting element (C).

20. The multi-speed transmission according to claim 1, wherein the third shifting element (C) and the fifth shifting element (E) have a common disk carrier which is fixed to the sun gear (SO3) of the third planetary gearset (RS3).

21. The multi-speed transmission according to claim 1, wherein the fourth shifting element (D) is axially located at least partially between the second planetary gearset (RS2) and the third planetary gearset (RS3).

22. The multi-speed transmission according to claim 1, wherein the fourth shifting element (D) is directly adjacent the second planetary gearset (RS2).

23. The multi-speed transmission according to claim 1, wherein the sixth shaft (6) completely overlies, in an axial direction, the fourth planetary gearset (RS4), the second planetary gearset (RS2), the third shifting element (C), the fifth shifting element (E) and the fourth shifting element (D).

24. The multi-speed transmission according to claim 1, wherein at least one one-way clutch is located between at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) and the transmission housing (GG).

25. The multi-speed transmission according to claim 1, wherein the input shaft (AN) and the output shaft (AB) of the transmission are provided on opposite sides of the transmission housing (GG).

26. The multi-speed transmission according to claim 1, wherein the input shaft (AN) and the output shaft (AB) of the transmission are located on a common side of the transmission housing (GG).

27. The multi-speed transmission according to claim 1, wherein at least one of an axle differential and a distributor differential is located on one of an input side and an output side.

28. The multi-speed transmission according to claim 1, wherein a coupling element is located, in the direction of the power flow, between a drive motor and the input shaft (AN).

29. The multi-speed transmission according to claim 28, the coupling element is one of a hydrodynamic converter, a hydraulic clutch, a dry starting clutch, a wet starting clutch, a magnetic-power clutch and a centrifugal clutch.

30. The multi-speed transmission according to claim 1, wherein the vehicle is started via one of the first shifting element (A), the second shifting element (B), the third shifting element (C) and the fourth shifting element (D), and the input shaft (AN) is permanently connected to a crankshaft of a drive motor in one of a rotationally fixed manner and a rotationally elastic manner.

31. The multi-speed transmission according to claim 1, wherein the vehicle is started in at least one of a forward direction and a reverse direction via one of the first shifting element (A) and the second shifting element (B).

32. The multi-speed transmission according to claim 1, wherein one of a wear free brake, a power take-off for driving additional units, an electric machine is fixed to at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) of the transmission, and the electric machine is at least one of a generator and an additional drive unit.

33. The multi-speed transmission according to claim 1, wherein each of the first shifting element (A), the second shifting element (B), the third shifting element (C), the fourth shifting element (D) and the fifth shifting element (E) is one of a friction-locking clutch, a friction-locking brake, a disc clutch, a band brake, a conical clutch, a form-fit clutch, a form-fit brake, a conical clutch and a claw clutch.

* * * * *